US008667798B2

(12) United States Patent
Hopper et al.

(10) Patent No.: US 8,667,798 B2
(45) Date of Patent: Mar. 11, 2014

(54) METHODS AND SYSTEMS FOR POWER GENERATION BY CHANGING DENSITY OF A FLUID

(75) Inventors: Leon Hopper, Riverview, FL (US); Stephen Dorozenski, Naples, FL (US); Jeffrey Barnett, Naples, FL (US)

(73) Assignee: Hopper Energy Systems, Inc., Naples, FL (US)

( * ) Notice: Subject to any disclaimer, the term of this patent is extended or adjusted under 35 U.S.C. 154(b) by 177 days.

(21) Appl. No.: 13/311,395

(22) Filed: Dec. 5, 2011

(65) Prior Publication Data

US 2012/0074713 A1   Mar. 29, 2012

Related U.S. Application Data

(63) Continuation-in-part of application No. 12/980,782, filed on Dec. 29, 2010.

(60) Provisional application No. 61/290,663, filed on Dec. 29, 2009, provisional application No. 61/290,671, filed on Dec. 29, 2009, provisional application No. 61/393,211, filed on Oct. 14, 2010.

(51) Int. Cl.
*F01K 25/06* (2006.01)

(52) U.S. Cl.
USPC ............... 60/649; 60/495; 60/496; 290/1 R; 290/43; 290/53

(58) Field of Classification Search
USPC ............... 60/495, 496, 649; 290/1 R, 43, 53
See application file for complete search history.

(56) References Cited

U.S. PATENT DOCUMENTS

| 2,129,292 | A | * | 9/1938 | Vinson | 417/329 |
| 4,233,813 | A | * | 11/1980 | Simmons | 60/496 |
| 4,326,132 | A | * | 4/1982 | Bokel | 290/1 R |
| 4,718,232 | A | * | 1/1988 | Willmouth | 60/495 |
| 5,685,147 | A | * | 11/1997 | Brassea | 60/496 |
| 7,434,396 | B2 | * | 10/2008 | McGahee | 60/495 |
| 7,656,051 | B2 | * | 2/2010 | Perin | 290/43 |
| 7,810,324 | B2 | * | 10/2010 | Lopez | 60/495 |

(Continued)

FOREIGN PATENT DOCUMENTS

| EP | 1566542 A1 | 8/2005 |
| WO | 9636810 A1 | 11/1996 |
| WO | 2008082221 A1 | 7/2008 |

OTHER PUBLICATIONS

Denardo, McGuire, "When do bubbles cause a floating body to sink?", American Journal of Physics, vol. 69, No. 10, Oct. 2001.

(Continued)

*Primary Examiner* — Kenneth Bomberg
*Assistant Examiner* — Daniel Wagnitz
(74) *Attorney, Agent, or Firm* — NK Patent Law, PLLC

(57) ABSTRACT

A method for generating energy from low-density fluids is provided. The method includes placing a first object in a first portion of fluid having a first density, injecting low-density fluids into the first portion of fluid in order to reduce the density thereof to a second density less than the density of the first object and thereby induce buoyancy-dependent translation of the first object in response thereto, and generating energy based upon buoyancy-dependent translation of the first object. Related apparatuses and systems are also disclosed.

13 Claims, 9 Drawing Sheets

(56) References Cited

U.S. PATENT DOCUMENTS

| | | | |
|---|---|---|---|
| 7,958,726 B2* | 6/2011 | Ribeiro | 60/495 |
| 7,969,033 B2* | 6/2011 | Ryan | 290/53 |
| 8,011,182 B2* | 9/2011 | Hastings | 60/496 |
| 8,024,927 B1* | 9/2011 | Azizi et al. | 60/496 |
| 8,151,565 B2* | 4/2012 | Carrion-Torres et al. | 60/465 |
| 8,171,729 B2* | 5/2012 | O'Briant | 60/495 |
| 8,453,443 B2* | 6/2013 | Kim | 60/496 |
| 8,456,027 B1* | 6/2013 | Seehorn | 290/1 R |
| 2003/0145589 A1* | 8/2003 | Tillyer | 60/496 |
| 2005/0188691 A1* | 9/2005 | Uhl et al. | 60/495 |
| 2006/0042244 A1* | 3/2006 | Villalobos | 60/495 |
| 2006/0064975 A1* | 3/2006 | Takeuchi | 60/495 |
| 2007/0080540 A1* | 4/2007 | Tung | 290/43 |
| 2008/0258471 A1* | 10/2008 | Karim | 290/1 R |
| 2008/0264056 A1* | 10/2008 | Tung | 60/496 |
| 2009/0090104 A1* | 4/2009 | Ribeiro | 60/495 |
| 2009/0127866 A1* | 5/2009 | Cook | 290/1 R |
| 2009/0293472 A1* | 12/2009 | Propp | 60/496 |
| 2010/0024413 A1* | 2/2010 | Kim | 60/496 |
| 2010/0223922 A1* | 9/2010 | McGahee | 60/495 |
| 2012/0090312 A1* | 4/2012 | Wilson et al. | 60/495 |
| 2013/0205768 A1* | 8/2013 | Kim | 60/495 |
| 2013/0247556 A1* | 9/2013 | Frank | 60/495 |

OTHER PUBLICATIONS

Hueschen, "Can bubbles sink ships?", American Journal of Physics, vol. 78, No. 2, Feb. 2010.

May, Monaghan, "Can a single bubble sink a ship?", American Journal of Physics, vol. 71, No. 9, Sep. 2003.

Wilson, "The Effects of Gas Aerated Seas Upon the Buoyancy and Stability of Floating Drilling Vessels", Thesis submitted to the Texas Tech University, Accepted Dec. 1987.

European Search Report dated Apr. 12, 2013, for related application EP10844281.5.

Australian Patent Office Examination Report dated Aug. 7, 2013.

Korean Patent Office Examination Report dated Oct. 15, 2013.

* cited by examiner

METHODS AND SYSTEMS FOR POWER GENERATION BY CHANGING DENSITY OF A FLUID

This application claims priority to U.S. Provisional Patent Application No. 61/290,663 filed on Dec. 29, 2009, U.S. Provisional Patent Application No. 61/290,671 filed on Dec. 29, 2009, and U.S. Provisional Patent Application No. 61/393,211 filed on Oct. 14, 2010, and U.S. Utility patent application Ser. No. 12/980,782 filed on Dec. 10, 2010, the contents of all of which are hereby incorporated by reference in their entirety.

TECHNICAL FIELD

The subject matter disclosed herein relates to methods and systems of electrical power generation. More specifically, the subject matter disclosed herein relates to power-generating systems and methods based on density changes within fluids utilizing a gas to change the density of the fluid.

BACKGROUND

New methods of producing electrical power are necessary for ecological, economic, and political reasons. Various renewable energy technologies such as wind, solar, and tidal have not been the answer to the world's current energy challenges as many of these technologies have inherent disadvantages. Current forms of energy production that use fossil fuels have well-documented limitations, including finite supplies and the release of green house gasses that impact the environment.

Non-fossil fuel source energy production technologies such as nuclear, geothermal, and hydrodynamic also have limitations such as where those technologies can be physically located, high capital investment costs, and negative environmental impacts.

It is known that mechanical energy from the motion of one of the forms of matter (solid, liquid, gas, or plasma) can be converted into electrical energy through an appropriate manner, such as a generator or magnetic induction system. The source mechanical energy is typically derived from 1) the conversion of the chemical energy in naturally occurring fossil fuels or manmade biofuels via combustion, 2) heat derived from nuclear reaction processes, or 3) the natural motion of water due to gravity, waves, or tidal forces.

Examples of commonly known energy production sources include fossil fuels such as coal, oil, natural gas, and shale, manmade biofuels, hydrodynamic dams including tidal designs, solar, wind, geothermal, and nuclear sources.

Many manufacturing and other industrial processes have by-products that have potential for conversion into energy. For example, wood is a by-product in many manufacturing processes and could be used to then heat a boiler or the like for producing HVAC services or electricity. Various other processes may have other waste products, such as exhaust gases, that may be converted into a useable energy.

In sum, each of these methods of energy production has various advantages and disadvantages. Accordingly a manner of energy production that addresses these disadvantages, while maintaining the advantages associated therewith, is desired.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is an apparatus that includes an object for being placed in a fluid having a first density. An energy generator is coupled to the object and configured for generating energy upon translation of the object. A gas injector is provided for injecting gases into the fluid to lower the density thereof to a second density that is less than the density of the object and thereby induce buoyancy-dependent translation of the object to generate energy by the energy generator.

According to another embodiment, an apparatus is provided that includes an object coupled to a pivot and configured for being placed in a fluid. An electrical generator is coupled to the object and configured for generating electricity upon pivoting translation of the object about the pivot. A gas injector is provided for injecting gases into the fluid to lower the density thereof to less than the density of the object and thereby induce pivoting translation of the object about the pivot to generate electricity by the electrical generator.

According to another embodiment, an apparatus is provided. The apparatus includes a first object coupled to a pivot and configured for being placed in a first portion of fluid. A second object is coupled to the pivot and configured for being placed in a second portion of fluid. The second object is coupled to the first object such that movement of the first object imparts a corresponding movement to the second object. An electrical generator is coupled to the pivot and configured for generating electricity upon pivoting translation of the first object and second object about the pivot. A gas injector is in communication with the first portion of fluid for injecting gases into the first portion of fluid to lower the density thereof to less than the density of the first object and thereby induce pivoting translation of the first object about the pivot to generate electricity by the electrical generator.

According to another embodiment, the energy generator produces energy upon reciprocal movement of the pivot.

According to another embodiment, the energy generator is an electrical generator.

According to another embodiment, the apparatus further includes a flow meter in communication with the low-density fluid injector.

According to another embodiment, the low-density fluid injector is a gas injector.

According to another embodiment, the gas injector injects carbon dioxide.

According to another embodiment, the low-density fluid injector defines baffles to disperse and separate injected fluids.

According to another embodiment, the energy generator is in communication with an energy storage device for storing generated energy.

According to another embodiment, the energy generator is in communication with an energy distribution grid.

According to another embodiment, the means for lowering the density of the fluid include low-density fluid injection, gas injection, and hot fluid injection.

According to another embodiment, the means for lowering the density of the fluid include imparting vibratory movements to a surface to create air-encapsulated dispersions within the fluid.

According to another embodiment, an apparatus is provided and includes a first object coupled to a pivot and configured for being placed in a fluid. An electrical generator is coupled to the pivot and configured for generating electricity upon pivoting translation of the first object about the pivot. A gas injector is provided in communication with the fluid for injecting gases therein to lower the density thereof to less than the density of the first object and thereby induce pivoting translation of the first object about the pivot to generate electricity by the electrical generator.

According to another embodiment, the fluid defines a first portion and a second portion, and the first object is placed in the first portion of the fluid.

According to another embodiment, the first object is carried on a first end of a lever, and the lever is coupled to the pivot According to another embodiment, the apparatus includes a second object that is carried on a second end of the lever. The second object is placed in the second portion of the fluid.

According to another embodiment, the first portion and the second portion are separated therebetween by a divider wall.

According to another embodiment, the pivot is carried by the divider wall.

According to another embodiment, the gas injector injects carbon dioxide gases into the fluid.

According to another embodiment, the gas injector injects gases into the first portion of the fluid.

According to another embodiment, an air separator is carried in the first portion for separating gases.

According to another embodiment, the first object and the second object generally approximate a prolate spheroid.

According to another embodiment, an apparatus is provided. The apparatus includes a chamber for containing a fluid and an object for being placed in the fluid. An electrical generator is configured for generating electricity upon translation of the object. A gas injector is provided in communication with the chamber for injecting gases into the fluid to lower the density thereof to less than the density of the object to thereby induce buoyancy-dependent translation of the object to generate electricity by the electrical generator.

According to another embodiment, the electrical generator is coupled to the object by a cable.

According to another embodiment, the electrical generator is positioned outside of the chamber.

According to another embodiment, any of the apparatus may be part of an energy generating system including a fluid source, energy storage devices, or energy consuming devices.

According to another embodiment, the object has a lower density than the natural density of the fluid.

According to another embodiment, the electrical generator is coupled to the object by a shaft configured for rotational movement upon buoyancy-dependent translation of the object.

According to another embodiment, the shaft defines a threaded portion on an outside thereof and the object defines an internal threaded void for receiving the threaded portion of the shaft.

According to another embodiment, the apparatus includes a geared assembly coupled to the shaft for imparting rotational movement to the electrical generator.

According to another embodiment, the electrical generator includes at least one magnet carried by the object and at least one induction coil carried by the chamber.

According to another embodiment, the at least one magnet includes a plurality of magnets, and further wherein, the plurality of magnets are placed in spaced-apart series about the object.

According to another embodiment, the at least one induction coil is carried along a length of the chamber.

According to another embodiment, the electrical generator includes at least one magnet carried by the chamber and at least one induction coil carried by the object.

According to another embodiment, the at least one magnet includes a plurality of magnets, and further wherein, the plurality of magnets are placed in spaced-apart series about the chamber.

According to another embodiment, the at least one induction coil is carried along a length of the object.

According to another embodiment, a method for generating energy is provided. The method includes providing an object in a fluid having a first density. The object is in engagement with an energy generator configured for generating energy upon translation of the object. The method also includes reducing the density of the fluid in order to impart buoyancy-dependent translation of the object in the fluid and generate energy by the energy generator and capturing energy generated by the energy generator.

According to another embodiment, a method of generating energy is provided. The method includes providing a first object in a first portion of fluid having a first density, injecting low-density fluids into the first portion of fluid in order to reduce the density thereof to less than the density of the first object and thereby induce buoyancy-dependent translation of the first object in response thereto, and generating energy based upon buoyancy-dependent translation of the first object.

According to another embodiment, placing a first object in a first portion of fluid includes placing the first object in a first position in the first portion of the fluid.

According to another embodiment, injecting low-density fluids into the first portion of the fluid includes injecting low-density fluids to induce buoyancy-dependent translation of the first object into a second position in the first portion of the fluid.

According to another embodiment, the method may further include allowing the density of the first portion of fluid to return to the first density to thereby induce buoyancy-dependent translation of the first object from the second position to the first position, and further including generating energy upon translation of the first object from the second position to the first position.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
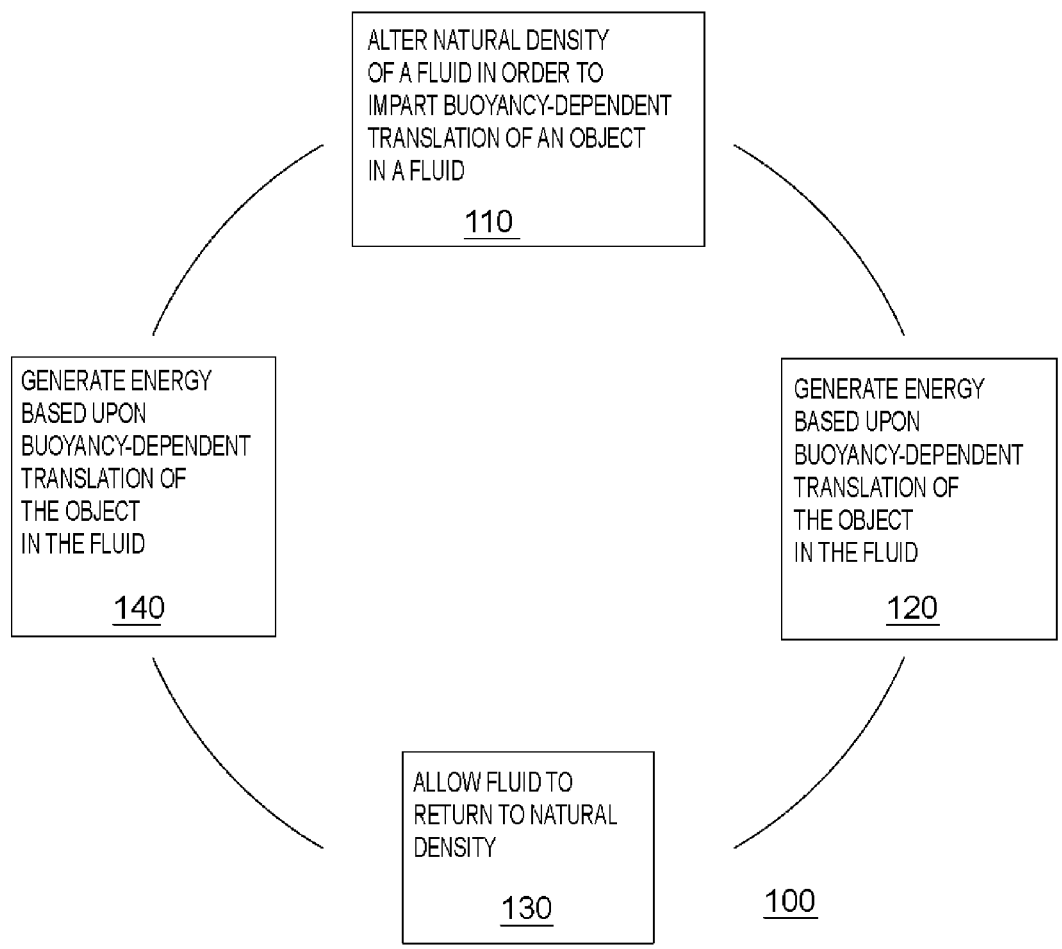
FIG. 1 depicts a flow chart illustrating one or more steps that may be performed according to a method disclosed herein.

Methods, apparatuses, and systems for converting buoyancy-dependent translation into energy are provided herein. In one or more embodiments, the methods, apparatuses, and systems of the presently disclosed subject matter are provided for converting buoyancy-dependent translation of an object positioned within a fluid into energy. A flow chart depicting one or more steps of the methods of converting buoyancy-dependent translation of an object into energy 100 is presented in FIG. 1. The method 100 includes altering the density of a fluid in order to impart buoyancy-dependent translation of an object in the fluid 110 in which the density of the fluid is altered to be less than the density of the object such that the object begins to translate in a generally downward direction. The object could be a first of many objects or a stand-alone object and could be placed in a first portion of a fluid. Implementation of the methods disclosed herein will be discussed in regards to various systems and apparatuses also disclosed herein, in which reference may be made to low-density fluid injection as one manner of altering the density of a liquid in order to impart buoyancy-dependent translation of an object. Injection of low-density fluids into a first portion of the fluid is one example of a manner of altering the density of a liquid, but other methods and manners are equally applicable and intended to be incorporated with the various systems and apparatuses disclosed herein. For example, altering the density of a liquid may include imparting a temperature change to a portion of fluid, injection of solid or semi-solid matter into a fluid, or imparting vibrational movement to a portion of fluid.

Energy is then generated based upon the buoyancy-dependent translation of the object in the fluid 120. The density of the fluid is then allowed to return to the natural density thereof 130. This return to natural density may be effectuated by, for example, the escape of low-density fluid bubbles such as gaseous bubbles into the surrounding environment or may be effectuated in response to some action by another system or apparatus. Energy may then be generated based upon the buoyancy-dependent translation of the object as the fluid returns to normal density 140. In this manner, the object may have a first position in which the object is suspended, emulsed, or floating within the fluid, and a second position which generally corresponds to the position of the object after the step of altering the natural density of a fluid in order to impart buoyancy-dependent translation of an object in a fluid 110. In the step generally corresponding to allowing the fluid to return to natural density 130 and generating energy based upon buoyancy-dependent translation of the object in the fluid 140, the object returns to the first position. As described herein, altering the natural density of a fluid may include reducing the density by injecting a low-density fluid into the fluid, or may, in alternate embodiments, include providing ultrasonic or other vibratory methods of creating low-density fluid voids within the fluid for reducing the density thereof. Still in other embodiments, this may be effectuated by harnessing natural gas expulsions from a natural source, such as an ocean floor. Each of those manners of reducing the density of the fluid in which the object is placed may be used in conjunction with any of the systems or apparatuses disclosed herein. These embodiments are provided as non-limiting examples, though it is envisioned that other manners of effectuating the same are encompassed within this description.

The term "object" is meant to include, but not be limited to, a single object, a plurality of objects, a device, or a plurality of devices moving through a fluid as described below. The movement of an object is also meant to include, but not be limited to, embodiments where the fluid and container holding the fluid are fixed, for example, fastened to a surface, and the object moves through the surrounding fluid, and embodiments where the object passing through the surrounding fluid in the previous embodiment is fixed, for example, fastened to a surface, and the fluid and container move around the object. For purposes of non-limiting description and illustration, embodiments described herein will describe embodiments where an object passes through a fluid held in a container.

It should be understood to those of skill in the art that embodiments are envisioned where the natural density of the object is less than or equal to the natural density of the surrounding fluid, and also embodiments where the natural density of the object is greater than the natural density of the surrounding fluid. For purposes of non-limiting description and illustration, the embodiments described herein will assume the object has a natural density less than or equal to the surrounding fluid.

In addition to varying the density of the surrounding fluid, the density of an object moving through the fluid can be varied to create a difference in the relative densities of the fluid and object. By way of non-limiting examples, a gas or other fluid can be injected into the interior of the object to increase its buoyancy, or non-gaseous matter (e.g. the surrounding fluid) can fill the interior of the object to decrease its buoyancy. In certain embodiments, the natural density of the fluid may be greater than the object, and in other embodiments the initial density of the fluid may be less than the object. In some embodiments, creating the largest density difference is advantageous as it creates the largest potential energy possible, and subsequently the largest kinetic energy possible when the subject matter disclosed herein is practiced. By varying the relative density of the object and surrounding fluid such that the density of the object is alternately less than and greater than the fluid, a cyclical pattern of motion of the object through the surrounding fluid is created. Appropriate suitable processes and/or systems can then be used to convert the kinetic energy of the object into electricity.

Figure 2:
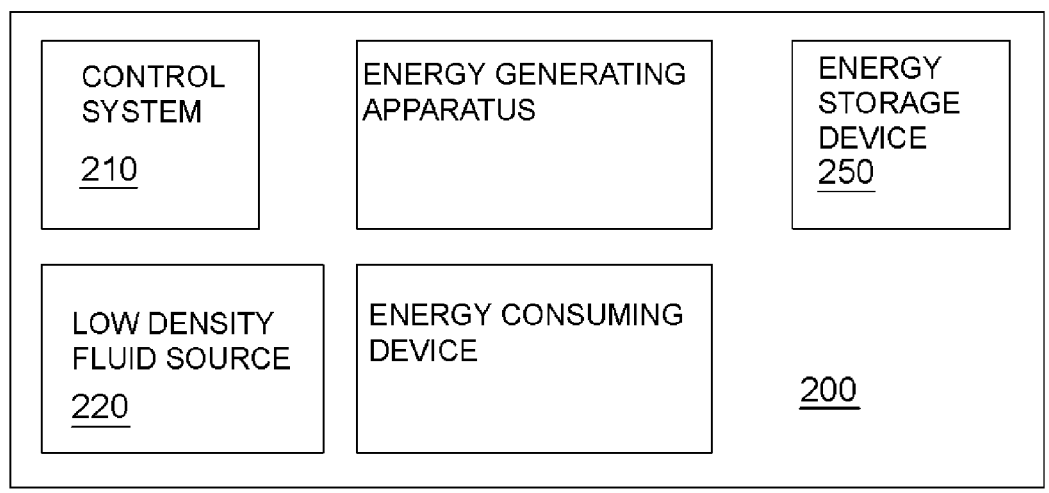
FIG. 2 depicts a schematic diagram of a system for generating energy according to one or more embodiments of the present invention.

A system for converting buoyancy-dependent translation of an object into energy is depicted in FIG. 2. The system 200 may generally include a control system 210 that is configured for dispensing a low-density fluid source 220. An energy generating apparatus is in communication with the control system 210 and the low-density fluid source 220. Various embodiments of the energy generating apparatus are depicted throughout the drawings. An energy consuming device or system may also be in communication with the energy generating apparatus for consuming energy generated thereby. Additionally, an energy storage device 250 may be provided for storing energy generated by the energy generating apparatus. The energy storage device 250 may be provided for any suitable form of energy storage, and may include battery cells or other chemical storage devices, electrical capacitors, supercapacitors, or magnetic energy storage, mechanical manners, thermal, or the like.

The methods, apparatuses, and systems of the presently disclosed subject matter are configured for use with the low-density fluid source 220, which may, in one or more embodiments, be a fluid source from a manufacturing or industrial facility. These facilities could include any facility that outputs some low-density fluid as a by-product. Examples of low-density fluids may include exhaust gases such as carbon dioxide that are exhausted from various industrial processes, or low-density fluids such as hot water. As used herein, "low-density" refers to a fluid having a density that is lower than the density of a body of fluid in which an object is placed in for use with any one of the energy generating apparatuses. While any appropriate fluid such as gas or a mixture of gases may be used, examples of gases that may be utilized include carbon dioxide, air, nitrogen, and gaseous products resulting from the combustion of fossil fuels, biofuels, or other carbon containing material.

Figure 3:
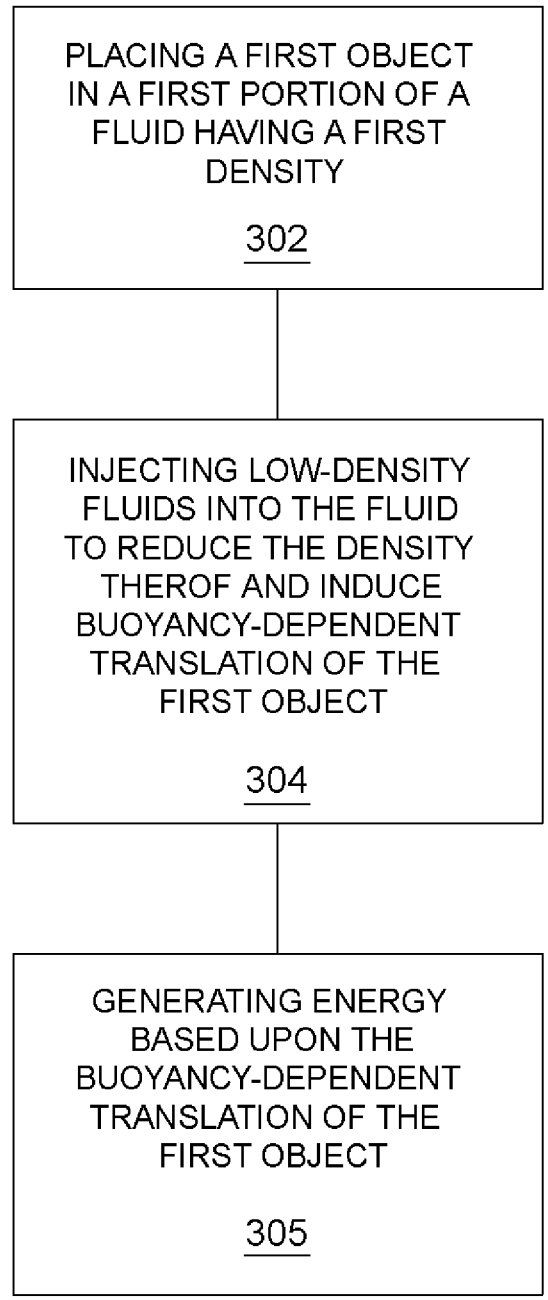
FIG. 3 depicts a flow chart illustrating one or more steps that may be performed according to a method disclosed herein.

One or more methods 300 for generating energy from a waste energy are schematically illustrated in the flow chart of FIG. 3. The one or methods 300 may include placing a first object in a first portion of fluid having a first density 302. The one or more methods 300 may include injecting low-density fluids into the first portion of fluid in order to reduce the density thereof to a second density less than the density of the first object and thereby induce buoyancy-dependent translation of the first object in response thereto 304. The one or more methods may include generating energy based upon buoyancy-dependent translation of the first object 306. Waste energy may be any fluid that is a by-product of some other process and is described further herein with reference to low-density fluids.

Figure 4:
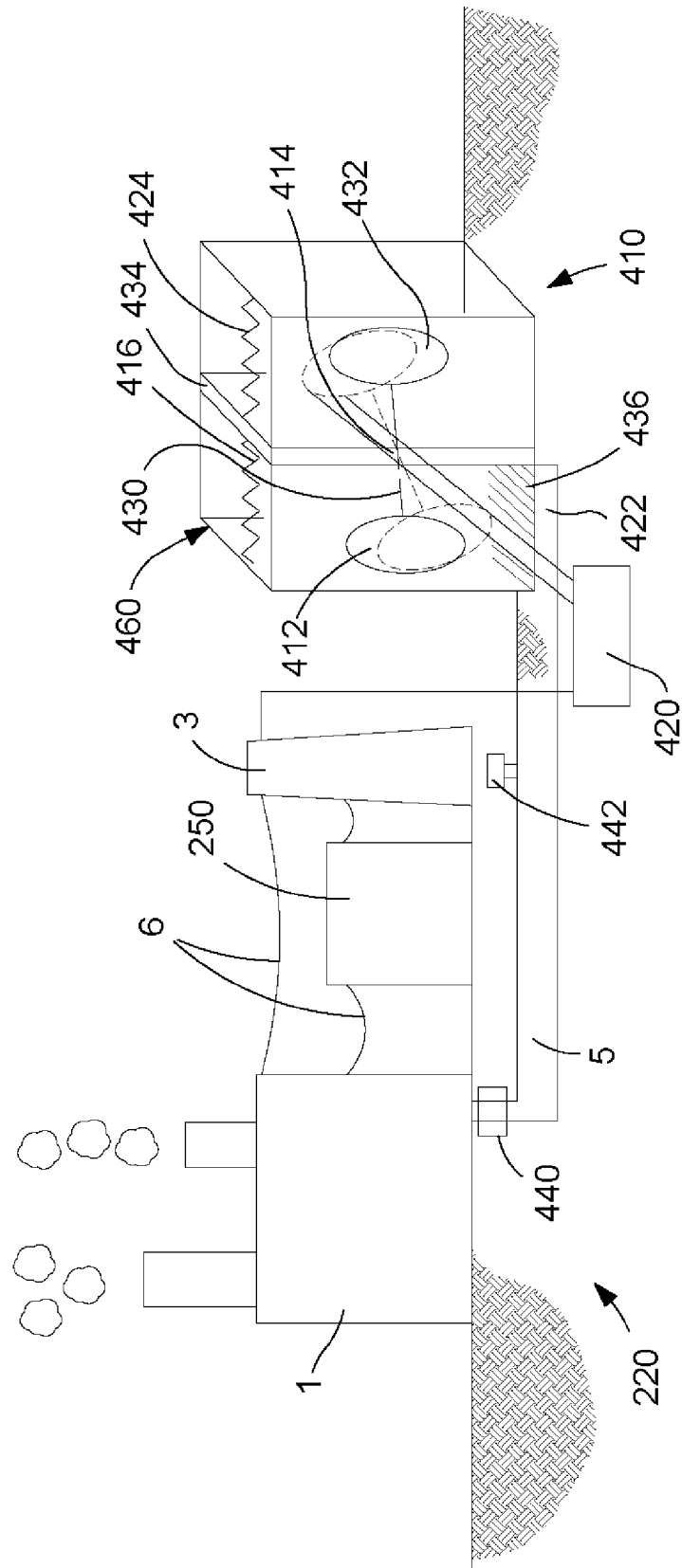
FIG. 4 depicts a system for generating energy from by-products according to one or more embodiments disclosed herein.

One example of an energy generating apparatus according to one or more embodiments of the presently disclosed subject matter is illustrated in FIG. 4 in which a production facility 1 could be used in combination with the methods, apparatuses, and systems of the presently disclosed subject matter. The production facility 1 may be a coal, nuclear, or other power plant, or may be any suitable industrial facility that has low-density fluid as a by-product. The facility 1 may include the external energy storage device 250. The energy storage device 250 may be connected with an energy transmission line such as a power line 6 to a power line support 3.

The facility 1 may be positioned on a nearby ground structure. Piping 5 or other appropriate devices may be provided for transporting a low-density fluid from the facility 1 to a first portion of fluid 416. A pump 440 may be provided for providing pumping forces to pump the low-density fluid from the facility 1 to the body of fluid 416. A flow meter 442 may be provided in communication with the piping 5 for monitoring the amount of low-density fluid that flows therethrough.

One or more embodiments according to the presently disclosed invention are depicted in FIG. 4 in which the facility 1 cooperates with an apparatus 410 for producing energy. The facility 1 is similarly coupled to energy storage device 250 and power transmission line support 3 by power transmission lines 6. A pump 440 may provide pumping forces to pump a low-density fluid through pipe 5. A flow meter 442 may be provided in communication with the pipe 5 for varying the flow of low-density fluid. A fluid injector 422 may be provided on an end of the pipe 5 for injecting low-density fluids into a first portion of fluid 416. A baffle or other type of fluid separator 436 may be provided about the outlet of the fluid injector 422 for dispersing low-density fluid. The apparatus 410 includes a first object 412 in the first portion of fluid 416 carried by a support 430 that extends from a pivot 414 that may be carried by a density barrier 434 for separating the first portion of fluid 416 from a second portion of fluid 424 in which a second object 432 is carried by the support 430 extending from the pivot 414. The pivot 414 is coupled to an electric generator 420 similar to generator 330 as disclosed in FIG. 3.

The apparatus 410 is configured for back and forth reciprocating movement in which the first object 412 translates downwardly when low-density fluid is injected into the first portion of fluid 416 and the density thereof is reduced to less than the density of the first object 412. The apparatus 410 may be configured such that intermittent applications of low-density fluid are injected into the first portion of fluid 416 such that enough low-density fluid is first injected into the first portion of fluid 416 until the first object 412 pivots counter-clockwise until almost reaching the density barrier 434. At that point, low-density fluid is no longer injected into the first portion of fluid 416 and the density begins to return to the natural density thereof. As this occurs, the first object 412 pivots clockwise until the relative vertical positioning is generally the same as that of the second object 432.

In one or more embodiments, a low-density injector may be provided at both the first portion of fluid 416 and the second portion of fluid 424 such that alternating, intermittent injections of low-density fluid can be made in each respective portion of fluid.

As illustrated in FIG. 4, the apparatuses for generating energy disclosed herein may be self contained in a stand-alone container 460 or may be part of a natural environment such as an ocean, lake, or other body of water.

As illustrated in the block generally relating to the step of generating energy based upon buoyancy-dependent translation of the object in the fluid 140, such a step may be encompassed by the apparatus 410. For example, as the first portion of fluid 416 returns to its natural density, the first object 412 will begin to undergo buoyancy-dependent translation in a generally upwards direction until the object 412 is in general alignment with the second object 432. In this manner, energy generation may be effectuated during generally upwards translation of the apparatus 410 as the first portion of fluid 416 returns to its natural density.

Many physical phenomena occur during the injection of low density fluid, specifically the bubbles created when injecting a low density fluid such as a gaseous fluid into a fluid such as a liquid. For example, due to their drag, impact, and sticking, the bubbles could directly produce upward forces on the body as they ascend upward. In addition, surface tension at the boundary of the body and liquid causes an upward force to be exerted on the body. There are also effects that could cause downward forces. There may be a shadow region above the body where bubbles are absent, whereas the equality of the average densities for sinking assumes that the bubbles are distributed uniformly throughout the liquid. This causes a greater pressure to be exerted on the top of the body, and thus corresponds to a downward force. Bubbles are deflected around the body, so there could be a layer of greater density of bubbles on the bottom surface of the body. This could cause the body to sink at a greater average fluid density, corresponding to an effective downward force. Due to entrained motion of the liquid, there is also a possible reduction of the buoyancy as a result of the Bernoulli effect. Further discussion on these phenomena can be found in the paper entitled "When do bubbles cause a floating body to sink" in the American Journal of Physics, October, 2001 edition by Denardo et al.

Figure 5:
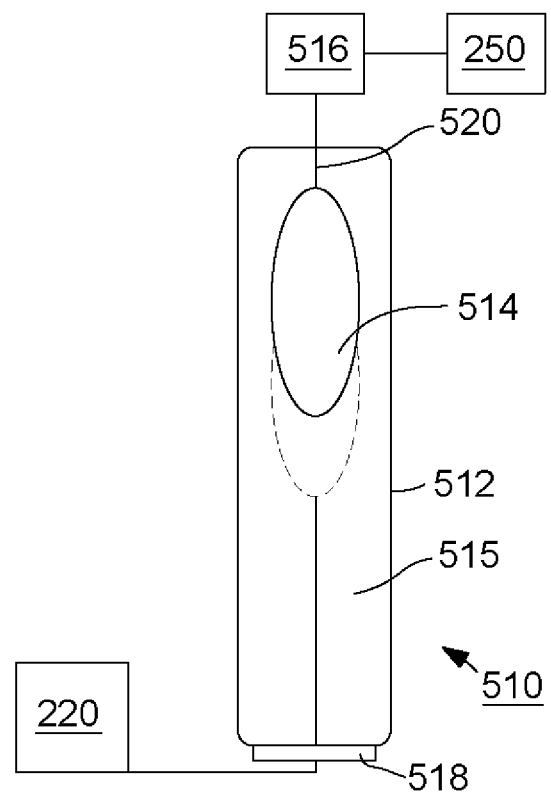
FIG. 5 depicts an apparatus for generating energy from by-products according to one or more embodiments disclosed herein.

An apparatus for generating electricity according to one or more embodiments of the disclosed subject matter is illustrated in FIG. 5 and is generally designated 510. The apparatus 510 may be in communication with a low-density fluid injector 518 that is in communication with the low-density fluid source 220. The apparatus 510 includes a chamber 512 that is configured for containing a fluid 515 therein. An object 514 is provided within the fluid 515 and is further coupled to an electrical generator 516 that is configured for generating electrical energy upon translation of the object 514. The object 514 is coupled to the electrical generator 516 by a linking member 520, which may be a cable, support rod, or similar structure. The electrical generator 516 may then be coupled to the energy storage device 250 for storing energy generated thereby. In other embodiments, the electrical generator 516 may be coupled directly with an energy consuming appliance or device.

The apparatus 510 is configured such that the object 514 has a density that is less than or equal to the natural density of the fluid 515 contained within the chamber 512. In this manner, the object 514 generally floats or is suspended within the fluid 515 when the fluid 515 is at natural density. As low-density fluid is injected into the chamber 512 by the injector 518, the object 514 will then begin to translate downwardly once the density of the fluid 515 is less than that of the object 514. As the object 514 translates downwardly, the linking member 520 will impart movement to the generator 516, thereby generating electrical energy. Low-density fluid may continue to be injected into the chamber 512 until the object 514 reaches a desired downward position. At that point, low-density fluid is no longer injected and the fluid 515 begins to return to its natural density. As this occurs, the object 514 will begin to translate upwardly to its initial position. Once the object 514 returns to its initial position, the low-density fluid injection process can be initiated again.

Figure 6:
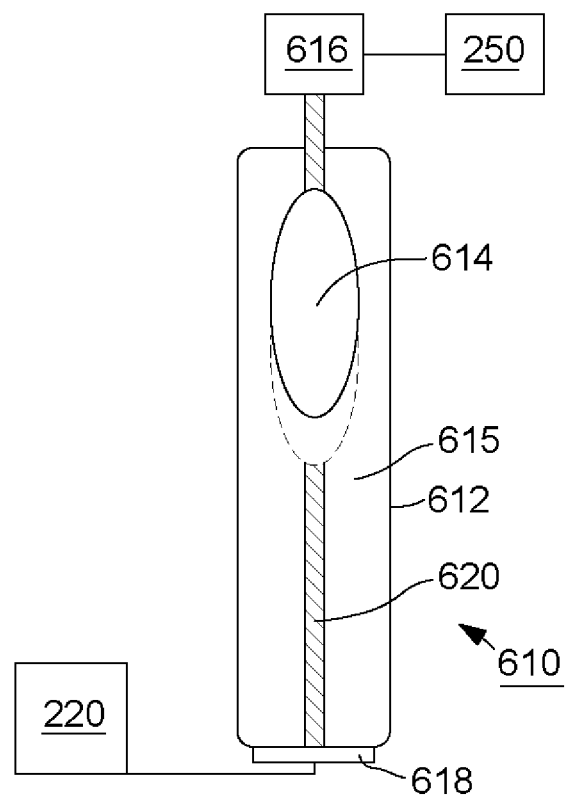
FIG. 6 depicts an apparatus for generating energy from by-products according to one or more embodiments disclosed herein.

An apparatus for generating electricity according to one or more embodiments of the disclosed subject matter is illustrated in FIG. 6 and is generally designated 610. The apparatus 610 may be in communication with a low-density fluid injector 618 that is in communication with the low-density fluid source 220. The apparatus 610 includes a chamber 612 that is configured for containing a fluid 615 therein. An object 614 is provided within the fluid 615 and is threadably received within a shaft 620. The shaft 620 is further coupled to an electrical generator 616 that is configured for generating electrical energy upon rotation of the shaft 620. The shaft 620 is configured for rotational movement as the object 614 translates upwardly and downwardly due to buoyancy-dependent translation thereof. This may be accomplished by affixing the object 614 to a wall of the chamber 612 such that the rotational arrangement of the object 614 remains the same as the object 614 translates vertically. The electrical generator 616 may then be coupled to the energy storage device 250 for storing energy generated thereby. In other embodiments, the electrical generator 616 may be coupled directly with an energy consuming appliance or device.

The apparatus 610 is configured such that the object 614 has a density that is less than or equal to the natural density of the fluid 615 contained within the chamber 612. As low-density fluid is injected into the chamber 612, the object 614 will then begin to translate downwardly once the density of the fluid 615 is less than that of the object 614. As the object 614 translates downwardly, the shaft 620 rotates and imparts corresponding rotational movement to the generator 616, thereby generating electrical energy. Low-density fluid may continue to be injected into the chamber 612 until the object 614 reaches a desired downward position. At that point, low-density fluid is no longer injected and the fluid 615 begins to return to its natural density. As this occurs, the object 614 will begin to translate upwardly to its initial position. Once the object 614 returns to its initial position, the low-density fluid injection process can be initiated again.

Figure 7:
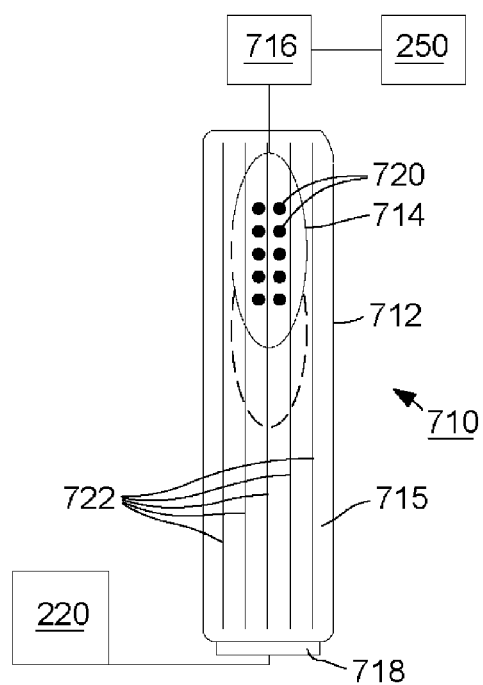
FIG. 7 depicts an apparatus for generating energy from by-products according to one or more embodiments disclosed herein.

An apparatus for generating electricity according to one or more embodiments of the disclosed subject matter is illustrated in FIG. 7 and is generally designated 710. The apparatus 710 may be in communication with a low-density fluid injector 718 that is in further communication with the low-density fluid source 220. The apparatus 710 includes a chamber 712 that is configured for containing a fluid 715 therein. An object 714 is provided within the fluid 715 and is configured for vertical buoyancy-dependent translation. The object 714 defines at least one magnet 720 on a surface thereof. Each of the magnets 720 are configured for induction energy generation upon translation about induction coils 722 defined on a surface of the chamber 712. An electrical transformer 716 may then be provided for converting the induction charges into a useable form of electricity. The electrical transformer 716 may then be coupled to the energy storage device 250 for storing energy generated thereby. In other embodiments, the electrical transformer 716 may be coupled directly with an energy consuming appliance or device.

The apparatus 710 is configured such that the object 714 has a density that is less than or equal to the natural density of the fluid 715 contained within the chamber 712. As low-density fluid is injected into the chamber 712, the object 714 will then begin to translate downwardly once the density of the fluid 715 is less than that of the object 714. As the object 714 translates downwardly, the induction energy is created by the passing of the magnets 720 by the coils 722. Low-density fluid may continue to be injected into the chamber 712 until the object 714 reaches a desired downward position. At that point, low-density fluid is no longer injected and the fluid 715 begins to return to its natural density. As this occurs, the object 714 will begin to translate upwardly to its initial position. Once the object 714 returns to its initial position, the low-density fluid injection process can be initiated again.

Figure 8:
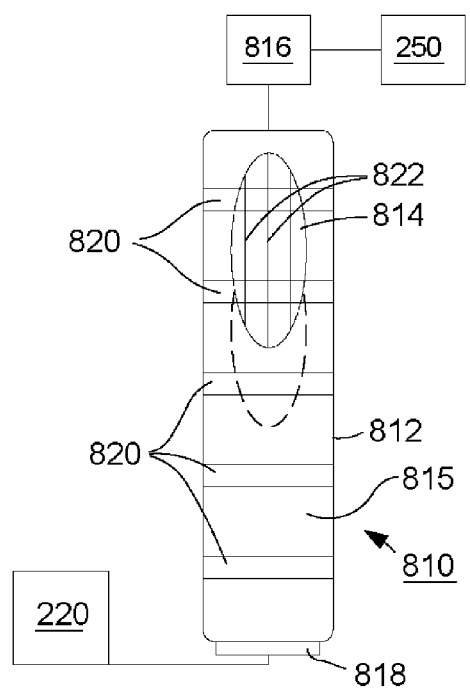
FIG. 8 depicts an apparatus for generating energy from by-products to one or more embodiments disclosed herein.

An apparatus for generating electricity according to one or more embodiments of the disclosed subject matter is illustrated in FIG. 8 and is generally designated 810. The apparatus 810 may be in communication with a low-density fluid injector 818 that is in further communication with the low-density fluid source 220. The apparatus 810 includes a chamber 812 that is configured for containing a fluid 815 therein. An object 814 is provided within the fluid 815 and is configured for vertical buoyancy-dependent translation. The object 814 defines at least one induction coil 822 on a surface thereof. Each of the induction coils 822 are configured for induction energy generation upon translation about magnets 820 defined on a surface of the chamber 812. An electrical transformer 816 may then be provided for converting the induction charges into a useable form of electricity. The electrical transformer 816 may then be coupled to an energy storage device 250 for storing energy generated thereby. In other embodiments, the electrical transformer 816 may be coupled directly with an energy consuming appliance or device.

The apparatus 810 is configured such that the object 814 has a density that is less than or equal to the natural density of the fluid 815 contained within the chamber 812. As low-density fluid is injected into the chamber 812, the object 814 will then begin to translate downwardly once the density of the fluid 815 is less than that of the object 814. As the object 814 translates downwardly, the induction energy is created by the passing of the magnets 820 by the coils 822. Low-density fluid may continue to be injected into the chamber 812 until the object 814 reaches a desired downward position. At that point, low-density fluid is no longer injected and the fluid 815 begins to return to its natural density. As this occurs, the object 814 will begin to translate upwardly to its initial position. Once the object 814 returns to its initial position, the low-density fluid injection process can be initiated again.

Figure 9:
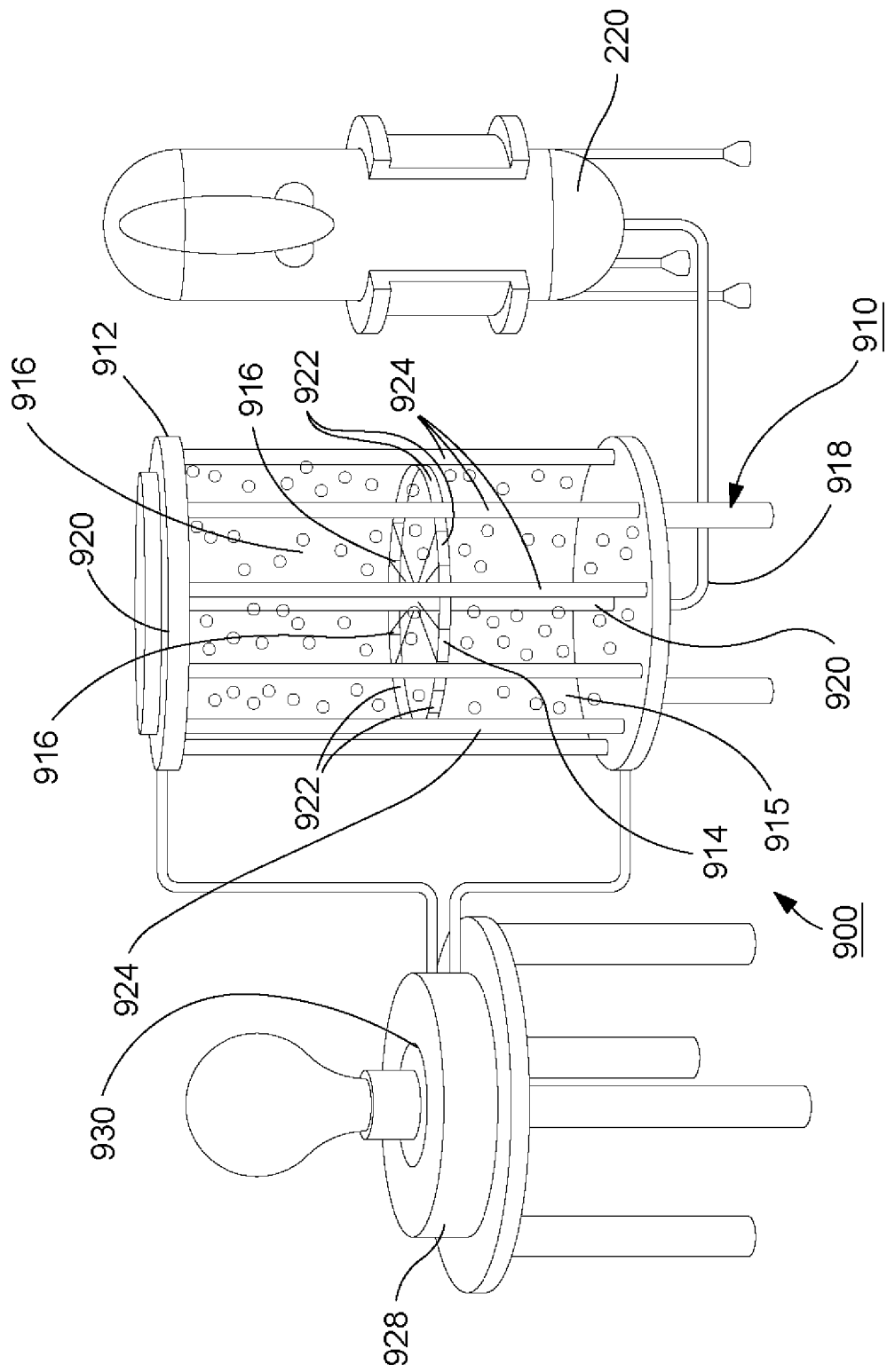
FIG. 9 depicts an apparatus for generating energy from by-products according to one or more embodiments disclosed herein.

A system 900 for use with an apparatus 910 for generating electricity according to one or more embodiments of the disclosed subject matter is illustrated in FIG. 9. The apparatus 910 may be in communication with a low-density fluid injector 918 that is in further communication with the low-density fluid source 220. The apparatus 910 includes a chamber 912 that is configured for containing a fluid 915 therein. A shuttle 914 is provided within the fluid 915 and is configured for vertical buoyancy-dependent translation. The shuttle 914 defines a ring of magnets 922 that extend in a periphery about the inner diameter of the chamber 912. The ring of magnets 922 may be spaced apart from a central shaft 920 that extends from a lowermost to an uppermost position within the chamber 912 and may be coupled together by a plurality of blades 916 extending from the central shaft 920 to the ring of magnets 922. Each of the magnets 922 are configured for induction energy generation upon translation about induction coils 924 defined on a surface of the chamber 912. This induction may be caused by generally vertical translation of the magnets 922 about the induction coils 924, or may be alternatively caused by rotational translation of the magnets 922 about the induction coils 924 due to an angular relationship of the blades 916 relative to the central shaft 920. An energy generator 928 may be provided for converting induction energy into other forms of energy. An energy consuming device 930, illustrated as a light bulb in FIG. 9, may be provided in communication with the energy generator 918 for using generated energy.

The apparatus 910 is configured such that the shuttle 914 has a density that is less than or equal to the natural density of the fluid 915 contained within the chamber 912. As low-density fluid is injected into the chamber 912, the shuttle 914 will then begin to translate downwardly once the density of the fluid 915 is less than that of the shuttle 914. As the shuttle 914 translates downwardly, the induction energy is created by the passing of the magnets 922 by the coils 924. The central shaft 920 may be provided with a threaded portion for imparting rotational movement to the shuttle 914 as is translates vertically. Low-density fluid may continue to be injected into the chamber 912 until the shuttle 914 reaches a desired downward position. At that point, low-density fluid is no longer injected and the fluid 915 begins to return to its natural density. As this occurs, the shuttle 914 will begin to translate upwardly to its initial position. Once the shuttle 914 returns to its initial position, the low-density fluid injection process can be initiated again.

Figure 10:
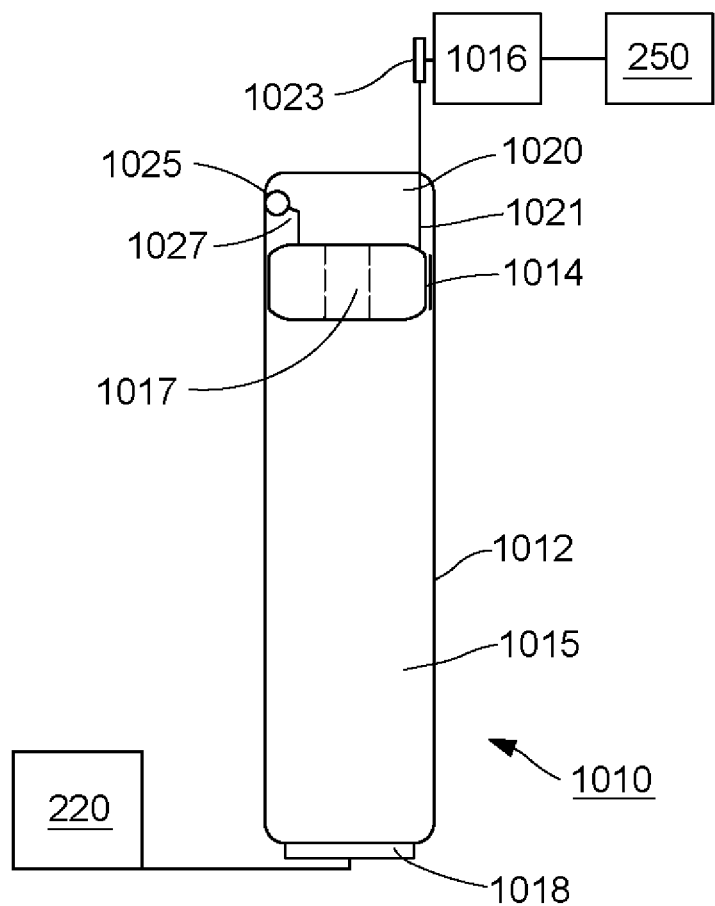
FIG. 10 depicts an apparatus for generating energy from by-products according to one or more embodiments disclosed herein.

An apparatus for generating electricity according to one or more embodiments of the disclosed subject matter is illustrated in FIG. 10 and is generally designated 1010. The apparatus 1010 may be in communication with a low-density fluid injector 1018 that is in further communication with the low-density fluid source 220. The apparatus 1010 includes a chamber 1012 that is configured for containing a fluid 1015 therein. An object 1014 is provided within the fluid 1015 and is configured for vertical buoyancy-dependent translation. The object 1014 may define an opening 1017 for allowing flowthrough of fluids within the chamber 1012.

The object 1014 may be coupled to a generator 1016 that has a hub 1023 extending therefrom and connected by a linking member 1021 which may be a belt and pulley assembly. The generator 1016 may then be coupled to the energy storage device 250 for storing energy generated thereby. In other embodiments, the generator 1016 may be coupled directly with an energy consuming appliance or device.

The object 1014 may further define a guide rail 1025 defined on the chamber for engaging a roller wheel 1027. The guide rail 1025 and roller wheel 1027 may be provided for maintaining the object 1014 in a desired position.

The apparatus 1010 is configured such that the object 1014 has a density that is less than or equal to the natural density of the fluid 1015 contained within the chamber 1012. As low-density fluid is injected into the chamber 1012, the object 1014 will then begin to translate downwardly once the density of the fluid 1015 is less than that of the object 1014. As the object 1014 translates downwardly, the generator 1016 generates energy. Low-density fluid may continue to be injected into the chamber 1012 until the object 1014 reaches a desired downward position. At that point, low-density fluid is no longer injected and the fluid 1015 begins to return to its natural density by escape of low-density fluids into the atmosphere. As this occurs, the object 1014 will begin to translate upwardly to its initial position. Once the object 1014 returns to its initial position, the low-density fluid injection process can be initiated again.

Alternatively, in one or more embodiments, an underground storage field may be utilized as a storage facility for storing compressed low-density fluid output from a power plant such as that depicted in FIGS. 3 and 4 in a process similar to Compressed Air Energy Storage (CAES). When used in conjunction with one of the energy generating systems or apparatuses disclosed herein, compressed gases and other fluids may be stored underground and then diverted to appropriate uses when desired. It may also be suitable to utilize one of the systems or apparatuses disclosed herein on a continuous or on a select basis. For example, if utilizing the injection of low-density fluids, it may be appropriate to operate one of the systems or apparatuses disclosed herein on a continuous basis. In other circumstances, it may be desirable to utilize one of the systems or apparatuses only during peak energy consumption periods so as to increase the spot supply during those peak times. Accordingly, a control system may be implemented to monitor energy usage about the energy grid, and then command operation of one of the systems or apparatuses disclosed herein in response to monitoring. In other embodiments, a recirculation and storage system may be utilized with any of the apparatuses disclosed herein for capturing spent low-density fluid after energy generation. This may be particularly advantageous for instances where carbon dioxide or other potentially unsafe low-density fluids are used. The captured low-density fluid could then be stored in an external storage tank, and optionally compressed for re-injection into one of the apparatuses disclosed herein and used to feed a biofuel stock such as algae. The energy for the optional compression can be provided by grid energy, from other energy sources such as excess wind or solar energy or from energy from the described process of translation of an object connected to a generator via a density change.

In other embodiments, tidal technologies may be employed with the subject matter disclosed herein. For example, roller plates stacked in a vertical shaft filled with a fluid and constructed adjacent to each other provide large scale energy generation on a small foot print. As low density fluid is injected into the bottom of the shaft, the low density fluid passes each roller plate, causing each roller plate to descend due to the reduced density.

Each of the apparatuses and systems described herein may be carried out in an open environment in which the low density fluid is allowed to escape to the environment.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An apparatus for generating electrical power from the movement of an object in a fluid, comprising:
    a chamber;
    a first fluid within the chamber having a fluid density,
    an object having a closed interior volume and arranged to move upwardly and downwardly within the chamber, the object having an object density that is less than the fluid density;
    a second fluid having an injected-fluid density less than the fluid density;
    a fluid injector that injects the second fluid into the first fluid in the chamber causing the object to move downward until the object reaches a particular position at which the fluid injector stops injecting the second fluid such that the object moves upward in the first fluid; and
    an electrical generator operatively coupled to the object for generating electrical power upon at least one of upward and downward movement of the object.

2. The apparatus according to claim 1, wherein the electrical generator includes a hub that extends into the chamber and a linking member that interconnects the hub and the electrical generator, wherein the electrical generator is configured for generating electrical power upon rotational movement of the hub.

3. The apparatus according to claim 1, wherein the chamber defines a guide that is engaged with a roller wheel carried by the object.

4. The apparatus according to claim 1, wherein the chamber defines a cylindrical shape.

5. The apparatus according to claim 1, wherein the object defines a cylindrical shape and is positioned within the chamber such that the object periphery maintains a generally equal spacing from the chamber.

6. The apparatus according to claim 5, wherein the object defines an opening therethrough for allowing flowthrough of liquid.

7. The apparatus according to claim 1, wherein the second fluid comprises carbon dioxide.

8. A method for generating electrical power from the movement of an object having a closed interior volume and arranged for sinking movement and rising movement in a liquid, the method comprising:
    providing a liquid having a liquid density;
    providing the object having an object density that is lower than the liquid density;
    placing the object in the liquid and permitting the object to float due to the lower density of the object density relative to the liquid density;
    injecting gas into the liquid below the object such that a gas-injected liquid is generated at least below the object, the gas-injected liquid having an injected-fluid density that is less than the object density;
    permitting sinking movement of the object in the gas injected liquid due to the lower density of the injected-fluid density relative to the object density;
    permitting rising movement of the object in the liquid due to the lower density of the object density relative to the liquid density; and
    generating electrical power from at least one of the sinking movement of the object and rising movement of the object.

9. The method according to claim 8, wherein permitting rising movement of the object includes permitting the injected gas to escape from the gas injected liquid.

10. The method according to claim 9, wherein injecting gas comprises injecting gas intermittently.

11. The method according to claim 10, wherein injecting gas into the liquid below the object comprises:
    injecting the gas into the liquid concurrently with permitting sinking movement of the object until the object reaches a particular position; and
    stopping the injection of the gas into the liquid when the object reaches the particular position.

12. A system for generating energy, comprising:
    a low-density fluid;
    a chamber containing a fluid having a first fluid density and an object having a closed interior volume and arranged for downward translation and upward translation within the chamber, the object having an object density less than the first fluid density;
    an injector that intermittently injects the low-density fluid into the fluid for lowering the first fluid density to a second fluid density that is less than the object density intermittently inducing buoyancy-dependent downward translation followed by the fluid returning to the first fluid density and inducing buoyancy-dependent upward translation of the object; and
    an electrical generator configured for generating electrical power upon at least one of downward and upward translation of the object.

13. The system of claim 12, wherein the low-density fluid is carbon dioxide

* * * * *